United States Patent
Touchette

[11] 3,734,559
[45] May 22, 1973

[54] TELESCOPIC TRAILER

[76] Inventor: Donat Pierre Touchette, Box 250, St. Jean Baptiste, Manitoba, Canada

[22] Filed: June 10, 1971

[21] Appl. No.: 151,763

[52] U.S. Cl. .......................296/23 C, 52/66, 296/27
[51] Int. Cl. ................................................B60p 3/34
[58] Field of Search ....................296/23 R, 23 C, 27, 296/26

[56] References Cited

UNITED STATES PATENTS

| | | | |
|---|---|---|---|
| 3,588,167 | 6/1971 | Ratcliff | 296/27 |
| 3,528,698 | 9/1970 | Miller | 296/27 |

Primary Examiner—Philip Goodman
Attorney—Kent & Ade

[57] ABSTRACT

The trailer consists of a base box-like portion with an open upper side and a top box-like portion slideable over the base portion with an open base so that the trailer can be collapsed for travel and storage or extended for use. A screw threaded shaft carries left and right hand threads thereon and a nut engages each of the portions of the shaft so that rotation of the shaft in one direction causes the nuts to move towards the center and in the other direction, to move towards the ends. Cables are attached to each nut, routed around pulleys and connected to the upper portion of the trailer body so that rotation of the shaft raises or lowers this portion relative to the base portion.

3 Claims, 12 Drawing Figures

PATENTED MAY 22 1973

INVENTOR.
Donat Pierre Touchette

BY

Kent v Ade

PATENTED MAY 22 1973 3,734,559

INVENTOR.
DONAT PIERRE TOUCHETTE
BY
Kent + Ade

TELESCOPIC TRAILER

BACKGROUND OF THE INVENTION

Means to raise and lower trailers from a usable position to a stored or towing position are well known and usually these consist of drums around which cables are wound, said cables being routed to the upper portion of the trailer to raise and lower same. Disadvantages include the fact that if the cables run over themselves while being wound upon the drums, the effective length of cable varies thus causing the upper portion of the trailer to jamb during the raising or lowering action. A further disadvantage includes effective means for guiding the upper portion of the trailer upon the lower portion during the elevating action and in sealing the two portions to prevent the ingress of dust, moisture or the like.

SUMMARY OF THE INVENTION

It is the purpose of the present invention to overcome these disadvantages and the principal object and essence thereof is to provide means to raise and lower the upper portion of the trailer relative to the lower portion thereof which eliminates any chance of the cables varying in length during the raising and lowering action.

Another object of the invention is to provide a device of the character herewithin described which includes a plurality of vertically situated tracks on one portion of the body together with corresponding guides secured to the other portion of the body thus ensuring effective vertical movement of the two portions one with the other which eliminates the tendency of the portions to jamb.

Yet another object of the invention is to provide a device of the character herewithin described which includes an efficient sealing means between the two portions when either in the lowered position or in the raised position.

Yet a further object of the invention is to provide a device of the character herewithin described which utilizes a worm gear principle so that the upper portion of the trailer remains in any position without the necessity of brakes thus eliminating any danger of the upper portion descending out of control.

Still another object of the invention is to provide a device of the character herewithin described which is simple in construction, economical in manufacture, and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying Figures in which:

DRAWINGS

In the drawings like characters of reference indicate corresponding parts in the different figures.

PRELIMINARY DESCRIPTION

The trailer 10 includes a chassis 11 mounted upon a wheel assembly 12 and includes a hitch 13.

Figure 1:
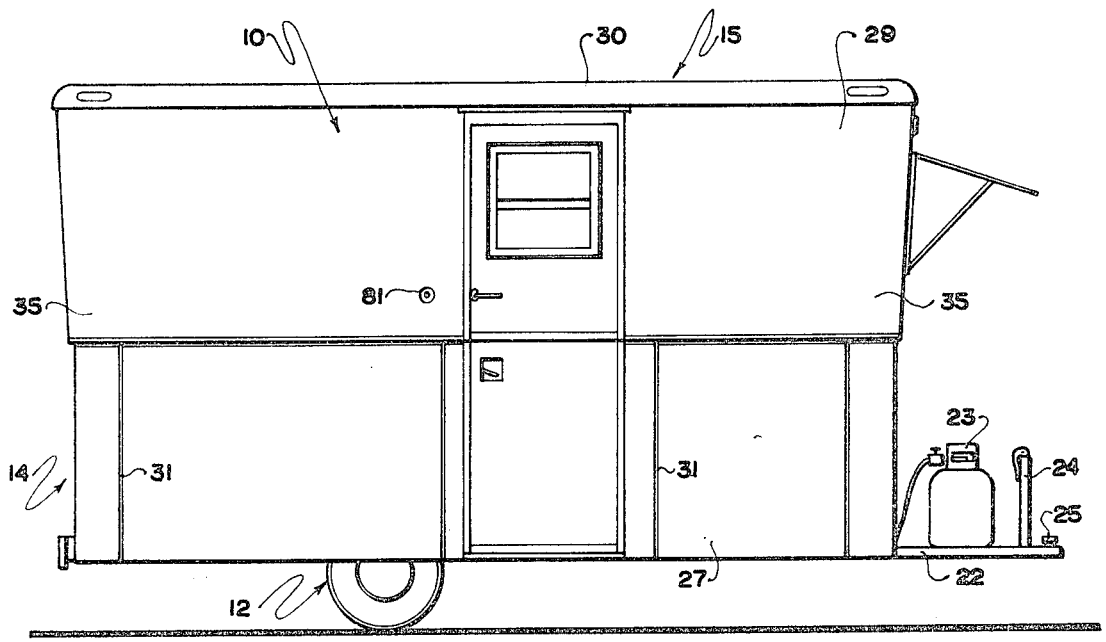
FIG. 1 is a side elevation of the trailer in the raised position.
Figure 2:
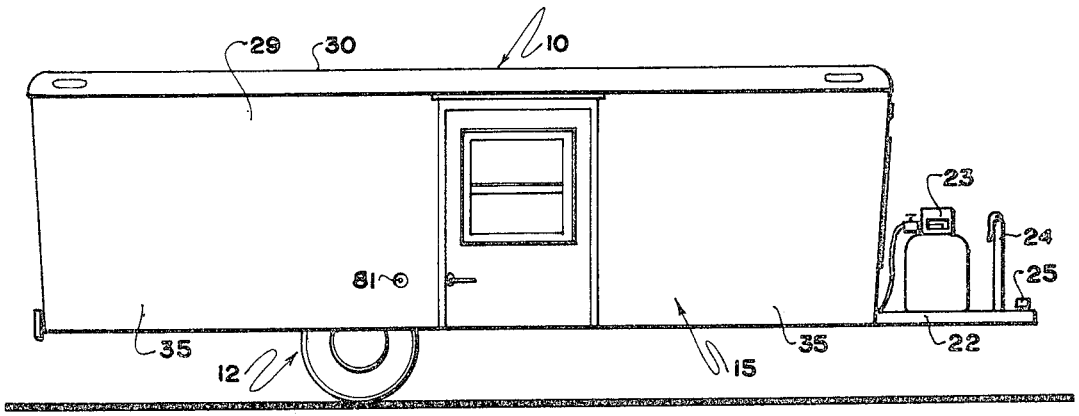
FIG. 2 is a view similar to FIG. 1 but showing the trailer in the lowered position.

A base or lower body portion 14 is mounted upon the chassis and an upper body portion 15 slideably engages over the lower body portion so that it can be raised and lowered as shown in FIGS. 1 and 2. Means 16 are provided within the chassis for raising and lowering the upper body portion 15 relative to the lower body portion 14.

DETAILED DESCRIPTION

Figure 3:
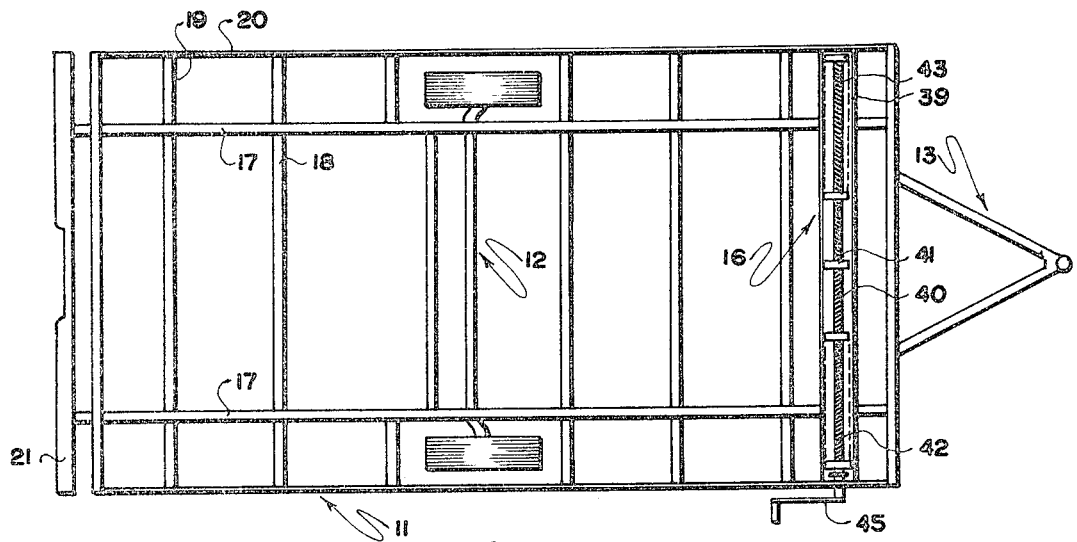
FIG. 3 is a top plan view of the chassis per se showing the drive mechanism.
Figure 4:
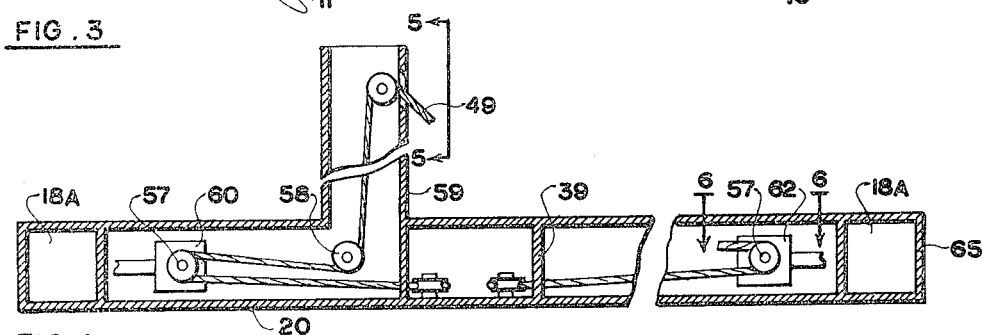
FIG. 4 is an enlarged fragmentary sectional view showing part of the elevating mechanism with the pulleys and cables thereon.

The chassis 11 is substantially convention in construction inasmuch as it consists of a longitudinal members 17, transverse members 18, outrigger members 19 and side longitudinal members 20 all of which are connected together to form a relatively rigid box-like structure shown in FIG. 3.

A rear bumper 21 is secured across the rear of the chassis and a conventional hitch component 22 extends forwardly of the chassis and carries the conventional propane gas tank 23, raising and lowering mechanism 24 and hitching mechanism 25.

The lower or base body portion 14 includes a floor 26 together with four sides 27 extending upwardly therefrom to form a box-like structure having an open upper side 28.

This base body portion is of course mounted upon the chassis in the conventional way.

The upper body portion 15 also consists of four sides 29 and a roof 30 all of which are preferably made of reinforced glassfiber, the techniques of which are conventional. The dimensions of the upper body portion 15 are slightly larger than the dimensions of the lower or base body portion 14 so that the upper body portion may engage over the base body portion as clearly shown in the drawings and may be raised to the position shown in FIG. 1 or lowered to the position shown in FIG. 2.

Figure 7:
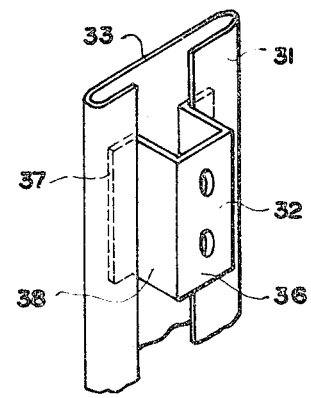
FIG. 7 is a fragmentary isometric view of a portion of one of the guides engaged within one of the tracks.

In this connection a plurality of vertical tracks 31 are secured to the walls or sides of one of the portions and guides 32 are secured to the walls or sides of the other of the portions in a position so that the guides engage the tracks as shown in FIG. 7.

In the embodiment illustrated, the tracks 31 are secured vertically to the outer sides of the walls or sides 27 of the base portion and details of these tracks are shown in FIG. 7.

Figure 8:
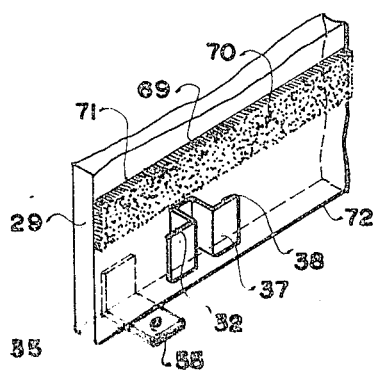
FIG. 8 is a fragmentary isometric view of one inside corner of one of the walls of the upper body portion.

They consist of an elongated planar base portion 33 having inturned spaced flanges 34 formed thereon. The guides 32 in the embodiment illustrated, are secured adjacent the lower corners 35 of the sides 29 and upon the inner surfaces thereof as shown in FIG. 8. These guides consist of an attaching portion 36 and outturned flange portions 37 spaced from the attaching portion by means of walls 38 clearly shown in FIGS. 7 and 8 and the out-turned flanges engage between flanges 34 and the planar portion 33 of the tracks as clearly shown.

By providing a plurality of guides and tracks around the perimeter of the walls of the trailer, vertical movement of the upper body portion 15 relative to the lower body portion 14, is assured with the minimum danger of the upper portion tipping relative to the lower portion thus causing the portions to jamb during the upper and lower movement thereof.

The means 16 for raising and lowering the upper body portion relative to the lower body portion consist of a channel or casing 39 spanning the chassis adjacent one end thereof and being secured thereto.

A shaft 40 is journalled within the casing and within pillow block bearings 41 and this shaft is provided with a right hand thread 42 upon one half there of and a left hand thread 43 upon the other half thereof.

The shaft extends beyond the chassis 11 and is supported within a bracket 44, said extension being shaped to receive a detachable hand crank 45 for rotating the shaft.

A nut component 46 consists of a block 47 preferably made of brass or the like centrally apertured as at 48 and internally screw threaded.

One block is screw threaded to engage the right hand thread 42 and the other block is screw threaded to engage the other or left hand threads 43.

When mounted upon the shaft 40, it will be appreciated that rotation of the shaft in one direction will cause the blocks to move towards the center thereof and rotation in the other direction will cause the blocks or nut components to move away from one another and towards the ends of the shaft. Rotation of the blocks is prevented by the casing 39.

Pairs of cables 49A and 49B are secured by the ends thereof to each of the blocks or nut components, one pair of cables 49A being secured to one block and the other pair of components 49B being secured to the other block.

Figure 11:
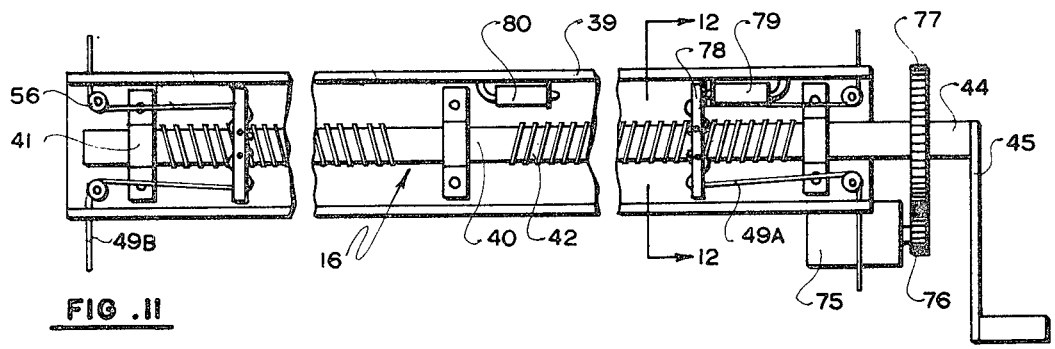
FIG. 11 is a top plan view of the raising and lowering mechanism with the cover of the casing removed for clarity.
Figure 12:
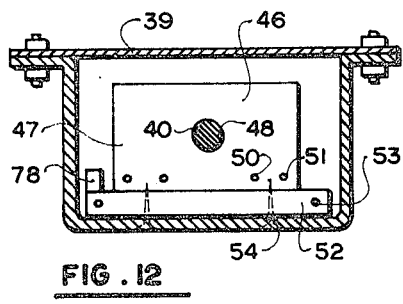
FIG. 12 is a section substantially along the line 12—12 of FIG. 11.

The blocks are apertured on each side of the central aperture 49 as indicated by reference characters 50 and 51 and a strip 52 is secured across the base of the block 47 with the ends extending beyond the sides of the block as clearly shown in FIG. 11.

Each cable engages through an aperture 53 within the ends of the strip 52, then passes through the block via aperture 51 and back through the block via aperture 50 and a set screw 54 engaging through the base of the block, clamps the end of the cable within aperture 50.

Figure 10:
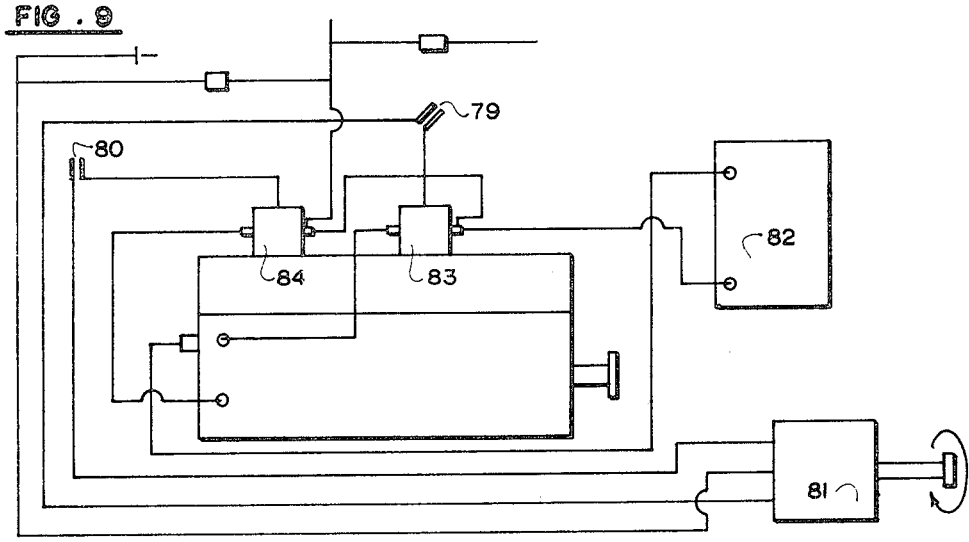
FIG. 10 is a schematic wiring diagram of the electric circuitry for operating the raising and lowering mechanism.

In FIG. 10, the cables are shown threaded through the apertures 52, 51 and 50 but they have not been pulled tight so that this threading is clearly visible.

Each cable after it leaves the side of the block extends towards the sides of the chassis and is routed around a set of pulleys to be connected by the other ends thereof through an apertured anchor 55 (see FIG. 8) situated upon the underside of the walls of the upper body portion and adjacent each corner thereof.

The sets of pulleys are identical and each include a grooved pulley 56 mounted for rotation in a horizontal plane adjacent the ends of the casing 39.

After passing around pulleys 56, the cable extends around a pulley assembly collectively designated 57 and situated in a vertical plane adjacent the outer transverse frame members 18A. The cable then extends inwardly around a further grooved pulley 58 journalled for rotation in a vertical plane adjacent the lower end of vertical channels 59 which extend upwardly from and form part of the walls 27 of the lower body portion, there being one such member adjacent each corner of the lower body portion.

Figure 5:
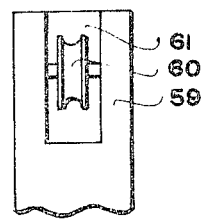
FIG. 5 is a fragmentary view of the upper pulley substantially along the line 5—5 of FIG. 4.
Figure 6:
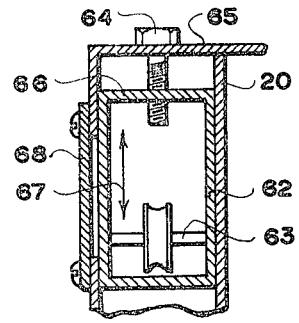
FIG. 6 is a top plan view of one of the cable adjustors with the upper portion of the casing removed, substantially along the line 6—6 of FIG. 4.

A further grooved pulley 60 is journalled for rotation within the upper end of these vertical members 59 and FIG. 5 shows this upper end cut away as at 61 to enable the cable to extend downwardly after passing around pulley 60, to be connected to the aforementioned anchor 55 adjacent each lowermost corner of the walls 29 of the upper body portion.

Referring back to the pulley assembly 57, this provides an adjustment within limits for each cable. It consists of a casing 62 carrying the pulley 57 for rotation upon a spindle 63. A screw threaded adjustor 64 extends through the wall 65 of the chassis frame and screw threadably engages one end 66 of the casing 62 so that rotation of the adjustor end shifts the casing as indicated by double headed arrow 67 and gives a length adjustment within limits to each individual cable. In this connection an inspection plate 68 is provided over the side chassis member 20 to provide access to this pulley assembly 57.

In operation, rotation of shaft 40 by means of hand crank 45 causes the nut components 46 to move towards one another or away from one another thus moving the pairs of cables 49A and 49B and hence raising or lowering the upper body portion 15 relative to the lower body portion 14 and it will be appreciated that if rotation of the hand crank ceases, then the movement of the upper body portion also ceases due to the worm gearing connection between shaft 40 and the nut components 46.

It will also be appreciated that the length of the four cables can be maintained relatively equal thus giving an even pull to all four corners of the upper body portion 15 and hence eliminating any tendency for jambing.

Figure 9:
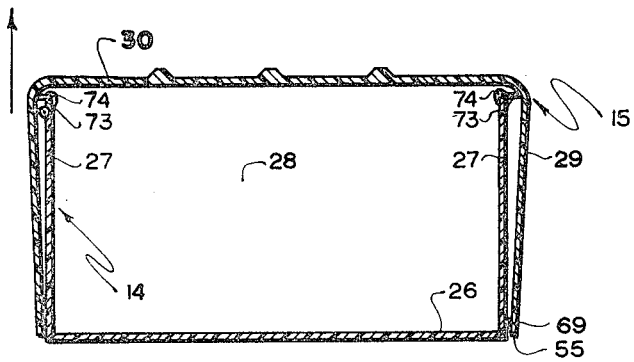
FIG. 9 is a cross sectional view of the trailer showing the relationship between the upper and lower body portions.

Means are provided to seal the upper body portion 15 to the lower body portion 14 to prevent the ingress of dust or moisture and reference to FIGS. 8 and 9 will show details of this. Extending perimetrically around the inner surface of the walls or sides 29 of the upper body portion 15 is a flexible sealing strip 69 consisting preferably of a form of hairy fiber 70 mounted upon a foam strip 71 which is adhesively secured parallel to the lower perimetrical edge 72 of the walls or sides 29 and this resilient seal slideably engages the outer surface of the wall 27 of the lower body portion 14.

A perimetrically extending laterally situated strip of felt or the like 73 is secured to the upper edge of the walls or sides 27 of the lower body portion 14 and extends laterally outwardly to slideably engage the inner surface of the walls 29 of the outer section. An aluminum trim strip or cap 74 engages over this felt strip and secures same to the upper edge of the walls 27.

Both the resilient strip 70 and the felt strip 73 engage the surfaces of the walls at all times and as the upper body portion 15 is raised to its uppermost extent, the resilient strip 70 approaches the felt strip 73 so that when in the raised position double protection is given at this rather vulnerable junction between the two sections.

If desired, the trailer may be raised and lowered electrically rather than by the hand crank 45. In this connection a reversible electric motor 75 is mounted adjacent the extended end of the shaft 40 and gear 76 may engage gear 77 as clearly shown in FIG. 10. Alternatively a chain may engage around sprockets connecting the shaft of the motor with shaft 40, it being understood that the necessary cover (not illustrated) will be provided for protection purposes. A switch engaging member 78 extends upwardly from strip 52 secured to block 47 and this member is adapted to engage limit switches 79 and 80 situated within casing 39 as shown in FIG. 10.

A three-pole operating switch 81 is situated near the door of the trailer on the upper body portion 15 as shown in FIGS. 1, 2 and 10.

The wiring diagram is shown schematically in FIG. 10 and includes the 12 volt battery as a source of power indicated by reference character 82. Solenoid switches 83 and 84 are associated with the motor 75 and the wiring between the components is conventional and is clearly shown in FIG. 10.

Limit switches 79 and 80 are normally closed so that switch 81, when held in one direction will start the motor and cause shaft 40 to rotate. As the nut component 46 reaches the end of the shaft 40, assuming it moves from the position shown in FIG. 10 to towards the limit switch 80, portion 78 hits limit switch 80 and cuts off power to the motor thus stopping the rotation of the shaft. Movement of switch 81 in the opposite direction completes the circuit and the nut component 46 moves outwardly upon shaft 40 to the position shown in FIG. 10 whereupon it trips limit switch 79 once again stopping the motor. By positioning the limit switches, the upper body portion 15 can be raised and lowered readily and easily. By limiting the length of screw threaded portions 42 and 43 upon shaft 40, manual operation of the shaft 40 cannot move the upper body portion 15 beyond the desired amount, particularly in the upward direction.

Various modifications can be made within the scope of the inventive concept which is herein disclosed and/or claimed.

What I claim as my invention is:

1. In a telescopic trailer, the combination of a wheeled chassis, a lower body portion mounted on said chassis, an upper body portion slidably telescoped over the lower body portion for raising and lowering movement, and screw-actuated cable means for raising and lowering said upper body portion, said means comprising an elongated housing provided in said chassis, a shaft with oppositely screw-threaded portions rotatably journalled longitudinally in said housing, a pair of oppositely screw-threaded nuts engaging the respective oppositely screw-threaded portions of said shaft, said nuts being slidable but non-rotatable in said housing, a pair of cables connected at one end thereof to each of said nuts, guide pulleys provided in said chassis and adjacent the top of said lower body portion, said cables passing around said guide pulleys and being connected at their other end to said upper body portion whereby the latter may be raised or lowered by rotation of said shaft, the device being characterized by provision of means for individually adjusting the effective length of each of said cables independently of the others, each of said adjusting means comprising an adjustment block slidably but non-rotatably mounted in said chassis, a rotatable pulley on said block, and an adjusting screw rotatably journalled in the chassis and screw-threadedly engaging said block whereby the latter may be slid back and forth when the screw is rotated, the associated cable being looped around said pulley on said block and extending therefrom in the direction of sliding movement of the block, whereby the effective length of the cable may be adjusted by varying the position of the block within the limits of its sliding movement.

2. The device as defined in claim 1 together with an electric motor operatively connected to said shaft for rotating the same selectively in opposite directions, and a pair of limit switches in normally closed circuit with said motor, said switches being mounted in said housing in the path of movement of one of said nuts and engageable thereby at the opposite ends of its travel, whereby to interrupt the circuit to said motor when said upper body portion reaches its fully raised or fully lowered position.

3. The device as defined in claim 1 together with sealing means between said upper and lower body portions, said sealing means comprising a lower sealing strip provided at the inside adjacent the bottom of the upper body portion in engagement with the outside of the lower body portion, and an upper sealing strip provided at the outside adjacent the top of the lower body portion in engagement with the inside of the upper body portion, said lower and upper sealing strips engaging each other when the upper body portion is in its fully raised position.

* * * * *